United States Patent [19]
Pickett et al.

[11] Patent Number: 5,209,370
[45] Date of Patent: May 11, 1993

[54] LAP TRAY

[76] Inventors: Ralph E. Pickett, 225 W. 3rd St., #415, Long Beach, Calif. 90802; Barton A. Hornstein, 17742 Steiner Cir., #A, Huntington Beach, Calif. 92647

[21] Appl. No.: 916,063

[22] Filed: Jul. 16, 1992

[51] Int. Cl.$^5$ .............................................. B65D 6/12
[52] U.S. Cl. .................................. 220/575; 220/17.1; 220/694; 206/557
[58] Field of Search ...................... 220/575, 17.1, 557, 220/574, 694

[56] References Cited

U.S. PATENT DOCUMENTS

| | | | |
|---|---|---|---|
| 884,767 | 4/1908 | Senseney | 220/575 |
| 933,542 | 9/1909 | Fitch et al. | 220/17.1 |
| 956,557 | 5/1910 | Weinberg | 220/17.1 |
| 1,048,303 | 12/1912 | Ekvail | 220/17.2 |
| 1,102,156 | 6/1914 | Lorenz et al. | 220/17.1 |
| 4,838,444 | 6/1989 | Bitel | 220/575 |

Primary Examiner—Joseph Man-Fu Moy

[57] ABSTRACT

Disclosed is a lap tray 10 particularly suited to be used by a person who has a lap belt 32 strapped around the lower torso. The lap tray 10 includes a flat panel 12 having an opening 26 in the panel adapted to receive a cup. A guard member 22 attached by a hinge 24 to the panel 12 may be folded inward towards the panel during storage, and unfolded outward towards the user during use. The underside 22a of the unfolded guard 22 rest against the user's lower torso with the tray 10 on the user's lap, and a clip 30 on the underside 22a of the guard 22 is attached to the lap belt 32 worn by the user. The perimeter of the panel 12 and the opening 26 are raised to provide walls sections 18 through 21 and wall section 28, respectively.

20 Claims, 4 Drawing Sheets

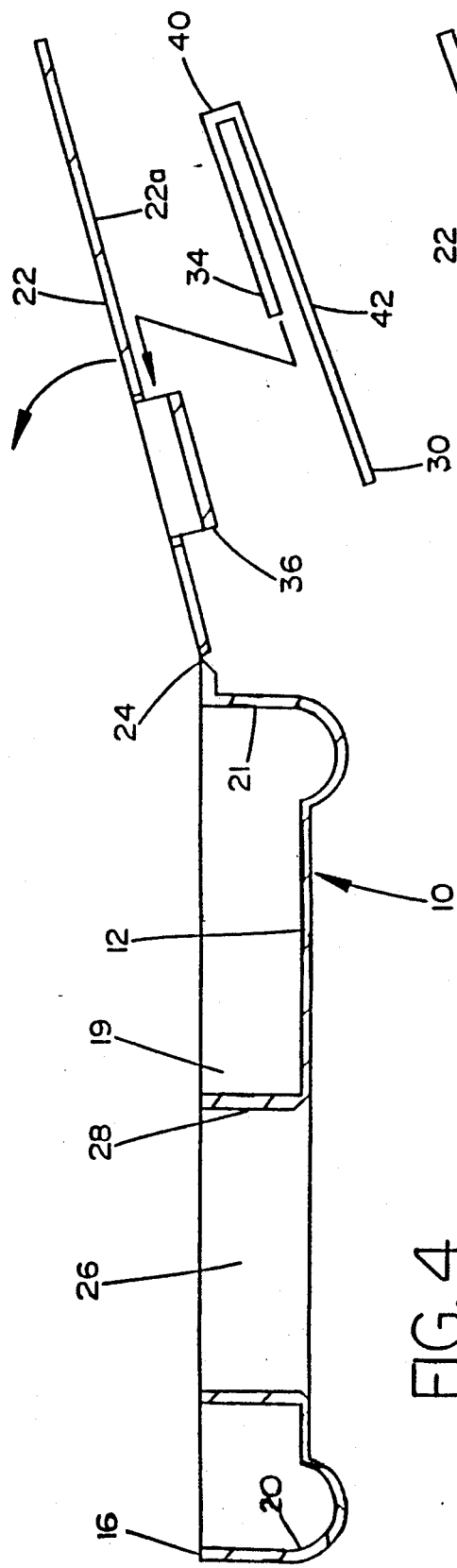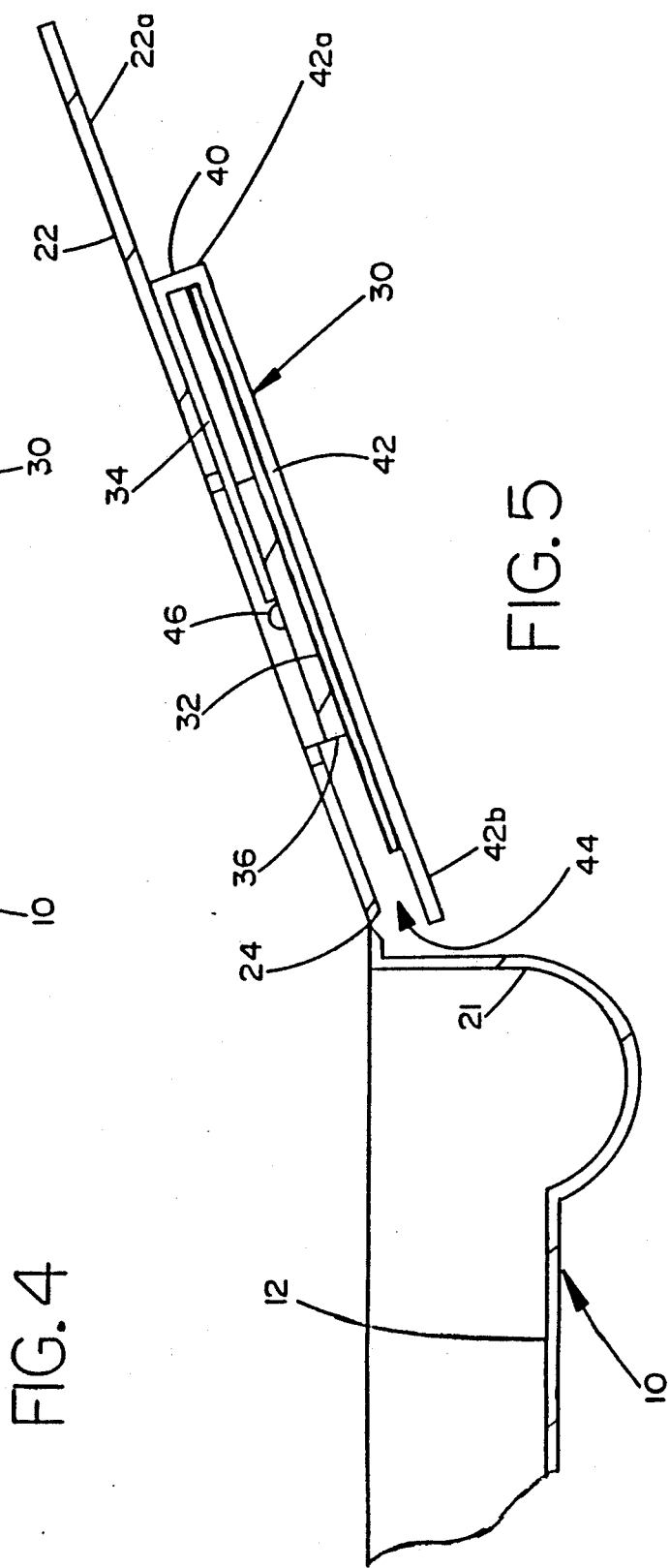

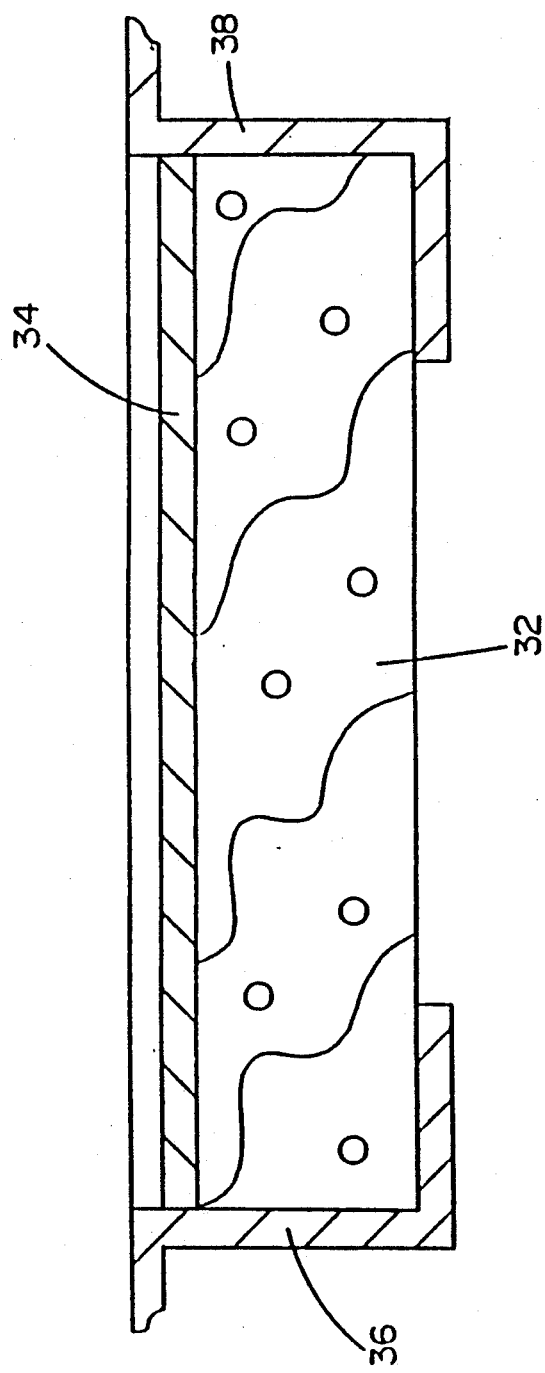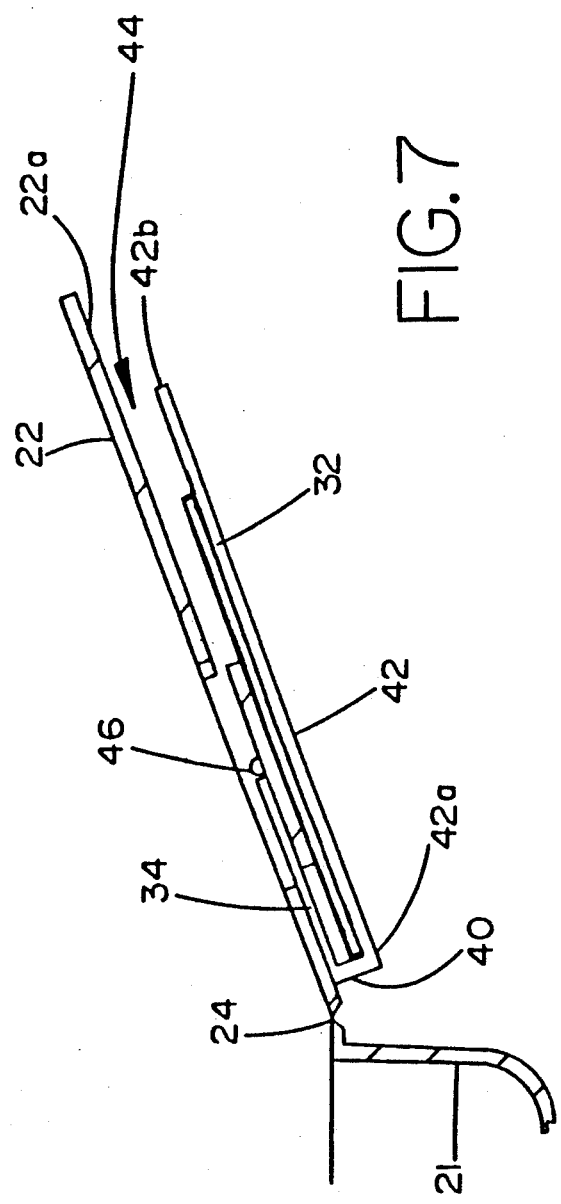

LAP TRAY

BACKGROUND OF THE INVENTION

1. Field of the Invention

This invention relates to a lap tray to be utilized advantageously by a person wearing a lap belt strapped around his or her lower torso. The lap tray of this invention includes a clip member adapted to be slipped around the lap belt to hold the lap tray in position on the lap of the user.

2. Background Discussion

With the advent of drive-thru, fast food restaurants, many automobile drivers simply order their food from the drive-thru counter, and eat it while driving. The problem they encounter is how, while driving, to hold food items and beverages and avoid spilling. It is convenient simply to rest the food items on their laps, and to set a beverage cup on the floor or seat. This frequently results in spilling, and possible staining of clothing or the automobile upholstery. It is the objective of this invention to provide a convenient lap tray for food items and beverage cups which may be used by occupants of vehicles such as automobiles, airplanes, buses, etc., or others in similar situations where a seat belt is used.

SUMMARY OF THE INVENTION

The device of this invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENTS," one will understand how the features of this invention provide its advantages, which include simplicity of use, low cost construction, convenience, compactness, and ease of storage.

The first feature is that the lap tray includes a panel adapted to be place on the lap of a user. The panel preferably has a raised perimeter, and provides a substantially flat, rectangular support surface which has a length of from 10 to 15 inches and a width of from 5.5 to 8.5 inches. This support surface provides a convenient place upon which food items may be placed by the user.

The second feature is that there is an opening in the panel which is adapted to receive a cup. The opening preferably has a raised perimeter and has a circular configuration. The diameter of the opening is from 2.5 to 4 inches. The opening is preferably located near a side of the panel which is furthest away from the torso of a user when the tray is placed on the user's lap.

The third feature is a guard member attached to the panel. The guard member may be in a fixed, rigid position pointing toward the user with the lap tray resting on the user's lap, or the guard member may be attached to the panel by a hinge member. The use of the hinge member allows the guard member to be folded inward towards the panel and unfolded outward towards a user. The guard member preferably has a rectangular configuration with a length of from 10 to 15 inches and a width of from 3 to 5 inches. The preferred form of hinge member is one which is integral with an edge of the raised perimeter of the panel, and may be formed at the time the panel is molded using conventional plastic molding techniques. The length of the guard and panel may be equal or the length of the guard may be slightly less than the length of the panel, for example, 1 to 3 inches.

The fourth feature is that the raised perimeters of the panel and opening each extend upward from said support surface at approximately an angle of 90°. The height of the perimeter of the panel and the height of the perimeter of the opening may be substantially equal, but there need not be a raised perimeter about the opening. The height of the raised perimeter about the panel is from 0.5 to 1.5 inches. The height of the raised perimeter about the opening is from 0 to 1.5 inches. The raised perimeter of the panel prevents food items from slipping off the support surface, and the raised perimeter of the opening aids in holding the beverage cup in position in the opening securely and acts as a barrier to prevent food crumbs from escaping through the opening.

The fifth feature is a clip element on the underside of guard member which is adapted to be attached to a lap belt worn by a user with the underside of the guard member resting against a user. The clip member has a leg member with a free end and another end at the underside of the guard member to form a stop. A substantial segment of the leg member is spaced from the underside to provide a gap between the underside and the leg member. This gap has an open mouth defined by the free end and the underside, with the gap receiving a lap belt worn by the user when the lap tray is placed on the user's lap and the lap belt is slipped into the open mouth and gap. The leg member slides over the lap belt until the belt engages the stop to hold the lap tray in position on the lap of the user. The clip element may be mounted in one of two different ways to the underside of the guard member. In one embodiment, the free end points towards the user with the guard member unfolded. In the other embodiment, the free end points away from the user with the guard member unfolded.

This invention also includes a method of holding food items and a beverage cup on the lap of a person seated and wearing a lap belt which is strapped across the lower torso of the person. This method comprises the steps of:

(a) providing a lap tray including a panel adapted to be place on the lap of the person, an opening in the panel which is adapted to receive the cup, a guard member extending outward towards the person when the lap tray is positioned on the lap of the person, and a clip element on the underside of the guard member which is adapted to be attached to the lap belt worn by the person; and (b) placing the lap tray on the lap of the person and attaching the clip member to the lap belt, and placing the food items on the panel and the cup in the opening.

DESCRIPTION OF THE DRAWING

The preferred embodiment of this invention, illustrating all its features, will now be discussed in detail. These embodiments depict the novel and non-obvious device and method of this invention shown in the accompanying drawing, which is for illustrative purposes only. This drawing includes the following figures (Figs.), with like numerals indicating like parts.

The seat belt is depicted with a shoulder harness strapped around the user's upper torso, and a lap belt strapped around the user's lower torso.

Figure 2:
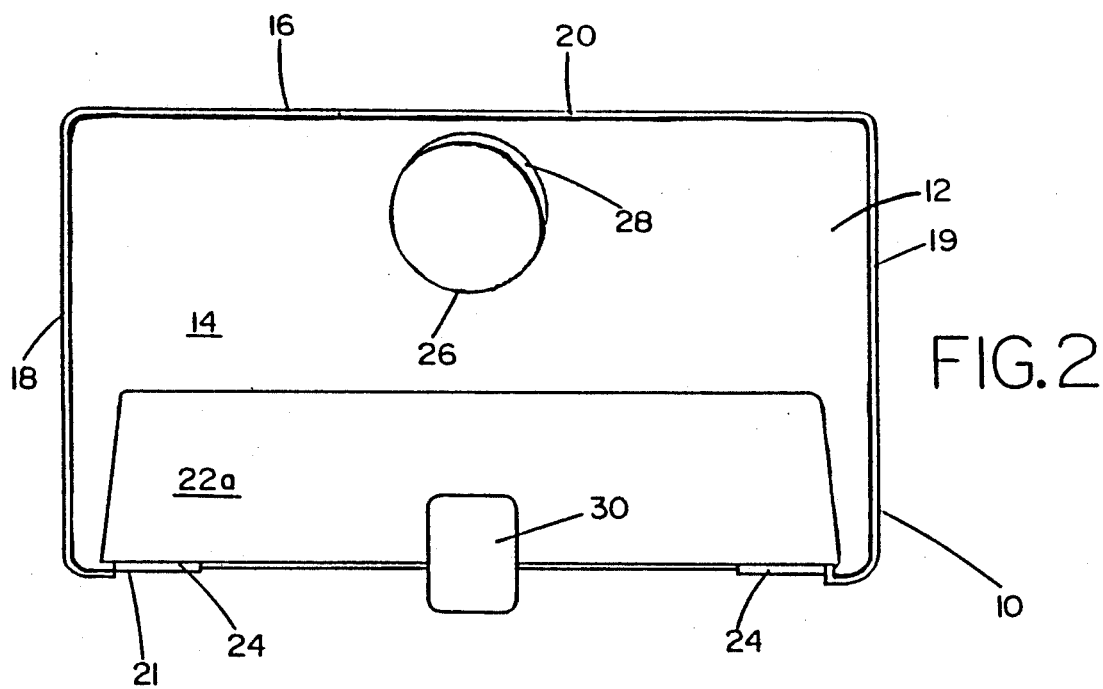

FIG. 2 is a perspective view of the lap tray of this invention with its splash guard folded inward over a food and beverage holding panel, showing a clip for attaching the tray to the lap belt which strapped around the lower torso of the user.

Figure 3:
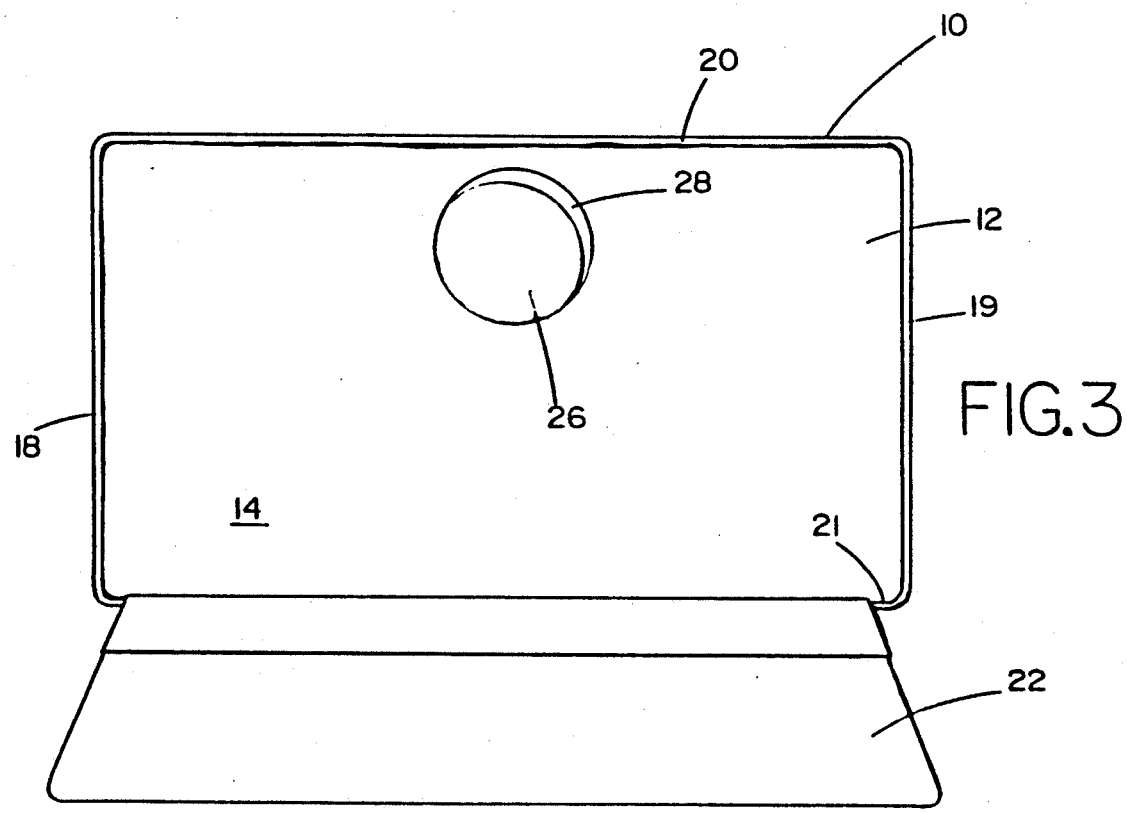

FIG. 3 is a perspective view similar to that shown in FIG. 3, showing the splash guard unfolded towards the user.

FIG. 4 is a cross-sectional view taken along line 4—4 of FIG. 3.

FIG. 5 is an enlarged fragmentary, cross-sectional view showing the lap tray on a user's lap with the clip attached the lap belt strapped around the lower torso of the user. The clip is mounted so that its free end points away from the user with the guard member unfolded.

FIG. 6 is a cross-sectional view taken along line 6—6 of FIG. 5.

FIG. 7 is an enlarged fragmentary, cross-sectional view showing another embodiment of the lap tray on a user's lap with the clip attached the lap belt strapped around the lower torso of the user. The clip is mounted similar to that shown in FIG. 5, except it has its free end pointing towards the user with the guard member unfolded.

DESCRIPTION OF THE PREFERRED EMBODIMENTS

Figure 1:
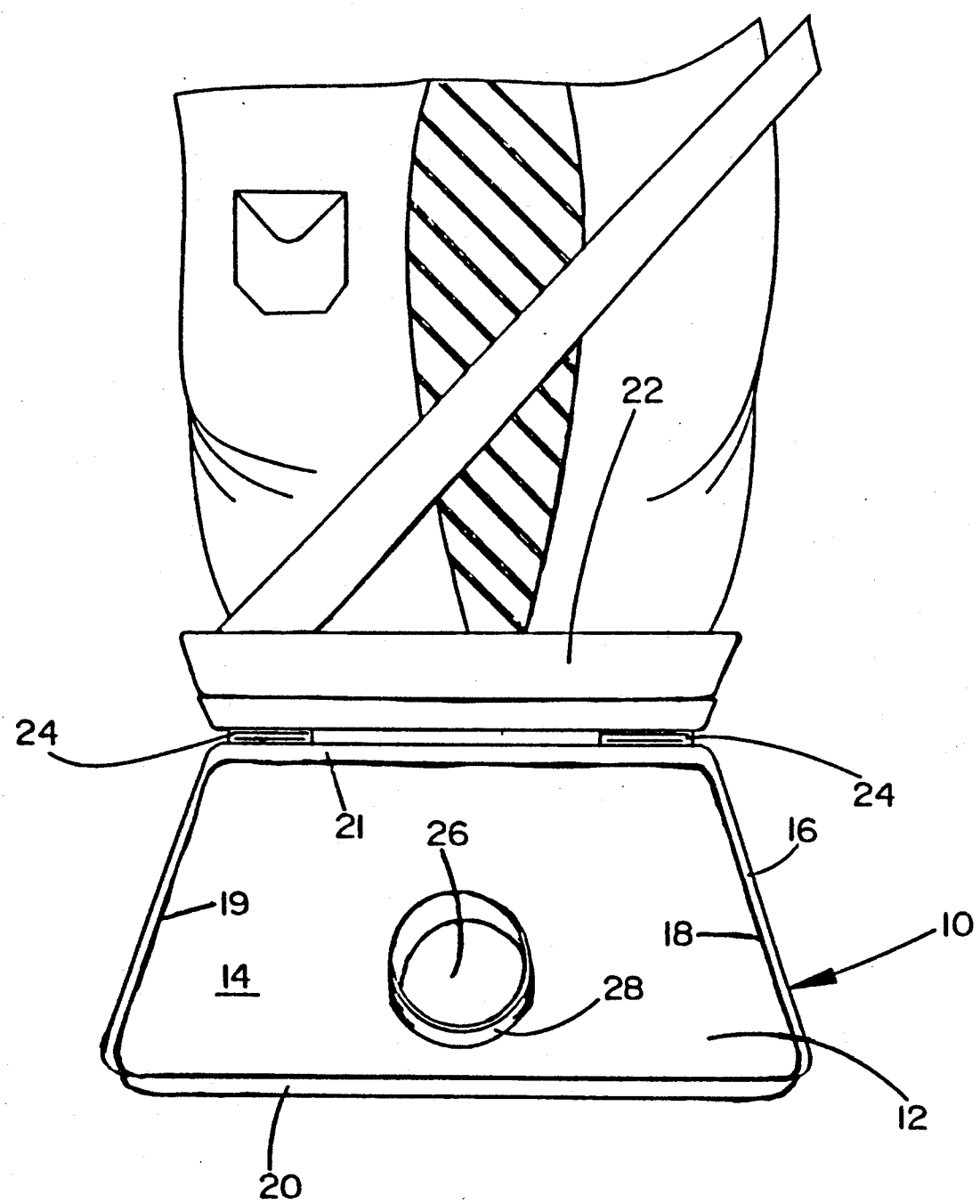
FIG. 1 is perspective view showing the lap tray of this invention resting on the lap of a user who is driving an automobile equipped with a conventional seat belt.

As depicted in the drawing, the tray 10 may be made from any suitable plastic material such as, for example, polystyrene foam, or other materials such as card board. As shown in FIGS. 1 through 3, the lap tray 10 of this invention includes a generally rectangular support panel 12, having a flat support surface 14, and a raised perimeter 16, which provides a rectangular, vertical wall with opposed lateral side wall sections 18 and 19 and opposed distal and proximal side wall sections 20 and 21, respectively. The height of these wall sections 18 through 21 are equal and approximately one inch. The length of the panel 12 is 14 inches and the width of the panel is 7 inches.

A splash guard 22 is attached by a living hinge 24 to the proximal side wall section 21, along an edge. This guard 22 has a rectangular configuration, with a length of 13 inches and a width of 4 inches. Near the distal side wall section 20, about midway between the lateral side wall sections 18 and 19 is an opening 26, preferably having a circular configuration with a diameter of approximately 3 inches. The position of the opening 26 is important because it ensures that a large eating area is provided on the support surface 14 close to the lower torso of the user.

There is a raised circular wall 28 coincident with the perimeter of the opening 26 which extends at a right angle upward from the support surface 14 of the panel. Preferably, the height of this circular wall 28 is equal to the height of the wall sections 18 through 21, or about one inch. The opening 26 provides a convenient location to place a beverage cup, which fits snug within the opening 26 so that spills are avoided.

As illustrated in FIGS. 4 through 7, a clip member 30 attached to the underside surface 22a of the splash guard 22 provides means for removably attaching the lap tray 10 to the lap belt 32 of a conventional seat belt strapped across the lower torso of the user. The clip member 30 has a connecting leg 34 inserted between a pair of rails 36 and 38, a stop wall 40 extending generally at a right angle from one end of the connecting leg 34, a belt leg 42 having one end 42a connected to the stop wall, and a free end 42b. In the embodiment shown in FIG. 5, the free end 42b points away from the user with the guard member 22 unfolded. In the embodiment shown in FIG. 7, the free end 42b points towards the user with the guard member 22 unfolded. There is a gap between the free end 42b and the underside surface 22a of the splash guard 22 which provides an open mouth 44 that allows the lap belt 32 to be slipped between the connecting leg 34 and belt leg 42. An edge of the lap belt 32 engages the stop wall 40. The embodiment shown in FIG. 7 is preferred because the tightening the lap belt 32 tends to hold the lap tray 10 more securely than the embodiment shown in FIG. 5. A raised button 46 (only one shown) on each of the rails 36 and 38 engage the free end 42b of the connecting leg 42, limiting its movement into the rails. This clip member 30 may be bonded in position, using an adhesive, ultrasonic welding, or other means.

The lap tray 10 of this invention is simple to use. One unfolds the splash guard 22, and places the tray on one's lap, slipping the clip member 30 onto the lap belt 32. To remove the tray 10, the user simple pulls the tray to disengage the clip member 30, slipping the belt leg 42 off the lap belt 32. The splash guard 22 is folded inward as depicted in FIG. 2, and the tray may be stored in any suitable location.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

1. A lap tray including
    a panel adapted to be placed on the lap of a user, said panel having a raised perimeter,
    an opening in the panel which is adapted to receive a cup, said opening having a raised perimeter,
    a guard member attached by a hinge member to the panel which may be folded inward towards the panel and unfolded outward towards a user, and
    a clip element on the guard member which is adapted to be attached to a lap belt worn by a user.

2. The lap tray of claim 1 where the panel has a substantially flat support surface and the raise perimeter of the opening extends upward from said support surface.

3. The lap tray of claim 3 where the height of the perimeter of the panel and the height of the perimeter of the opening are substantially equal.

4. The lap tray of claim 1 where the panel has a substantially rectangular configuration.

5. The lap tray of claim 4 where the panel has a length of from 10 to 15 inches and a width of from 5.5 to 8.5 inches.

6. The lap tray of claim 3 where the height of the perimeter of the panel and the height of the perimeter of the opening are from 0.5 to 1.5 inches.

7. The lap tray of claim 1 where the guard member has an underside which rest against a user when the guard member is folded outward towards the user, and the clip member is on said underside.

8. The lap tray of claim 7 where the clip member has a leg member with a free end and another end at the underside of the guard member to form a stop, a substantial segment of said leg member being spaced from said underside to provide a gap between the underside and the leg member, said gap having an open mouth defined by the free end and the underside, said gap receiving a lap belt worn by the user when the lap tray is placed on the user's lap and the lap belt is slipped into the open mouth and gap, said leg member sliding over the lap belt until the belt engages the stop to hold the lap tray in position on the lap of the user.

9. The lap tray of claim 1 where the opening is circular.

10. The lap tray of claim 9 where the opening has a diameter of from 2.5 to 4 inches.

11. The lap tray of claim 1 where the opening is located near a side of the panel which is furthest away from the torso of a user when the tray is placed on the user's lap.

12. A lap tray including
a substantially rectangular panel having a raised perimeter width a height of from 0.5 to 1.5 inches, said panel having a length of from 10 to 15 inches and a with of from 5.5 to 8.5 inches and being adapted to be place on the lap of a user, having an underside which rest on the user's lap and a substantially flat support surface upon which food items may be placed by the user,
a circular opening in the panel which is adapted to receive a cup, said circular opening having a raised perimeter which extends upward from said support surface and has a height of from 0 to 1.5 inches and a diameter of from 2.5 to 4 inches,
a rectangular guard member having a length of from 10 to 15 inches and a width of from 3 to 5 inches, said guard member being attached by a hinge member to a portion of the raised perimeter of the panel which is closets to the user's torso when the panel is on the user's lap, said hinge member enabling the guard member to be folded inward towards the panel and unfolded outward towards the user, and
a clip element on the guard member which is adapted to be attached to a lap belt worn by a user when the tray is placed on the lap of a user.

13. The lap tray of claim 12 where the height of the perimeter of the panel and the height of the perimeter of the opening are substantially equal.

14. The lap tray of claim 12 where the opening is located near a side of the panel which is furthest away from the torso of a user when the tray is placed on the user's lap.

15. The lap tray of claim 12 where the guard member has an underside which rest against a user when the guard member is unfolded outward towards the user, said clip member being on said guard member underside.

16. A lap tray including
a panel adapted to be place on the lap of a user,
an opening in the panel which is adapted to receive a cup,
a guard member attached to the panel which extends outward towards a user when the lap tray is placed on the user's lap,
said guard member having an underside which rests against the user when the lap tray is placed on the user's lap, and
a clip element on the underside of the guard member which is adapted to be attached to a lap belt worn by a user.

17. The lap tray of claim 16 where the clip member has a leg member with a free end which points towards the user when the lap tray is on the user's lap and another end at the guard member underside to form a stop, a substantial segment of said leg member being spaced from said guard member underside to provide a gap between the guard member underside and the leg member, said gap having an open mouth defined by the free end and the guard member underside, said gap receiving a slap belt worn by the user when the lap tray is placed on the user's lap and the lap belt is slipped into the open mouth and gap, said leg member sliding over the slap belt until the belt engages the stop which holds the lap tray in position on the lap of the user.

18. The lap tray of claim 16 where the clip member has a leg member with a free end which points away from the user when the lap tray is on the user's lap and another end at the guard member underside to form a stop, a substantial segment of said leg member being spaced from said guard member underside to provide a gap between the guard member underside and the leg member, said gap having an open mouth defined by the free end and the guard member underside, said gap receiving a slap belt worn by the user when the lap tray is placed on the user's lap and the lap belt is slipped into the open mouth and gap, said leg member sliding over the slap belt until the belt engages the stop which holds the lap tray in position on the lap of the user.

19. The lap tray of claim 16 where the panel has a raised perimeter.

20. A method of holding food items and a beverage cup on the lap of a person seated and wearing a lap belt which is strapped across the lower torso of the person, comprising
(a) providing a lap tray including a panel adapted to be place on the lap of the person, an opening in the panel which is adapted to receive the cup, a guard member attached to the panel which extends outward towards the person, and a clip element on the guard member which is adapted to be attached to the lap belt worn by the person; and
(b) placing the lap tray on the lap of the person and attaching the clip member to the lap belt, and placing the food items on the panel and the cup in the opening.

* * * * *

UNITED STATES PATENT AND TRADEMARK OFFICE
CERTIFICATE OF CORRECTION

PATENT NO. : 5,209,370
DATED      : May 11, 1993
INVENTOR(S): Ralph E. Pickett and Barton A. Hornstein It is certified that error appears in the above-indentified patent and that said Letters Patent is hereby corrected as shown below:

Column 1, line 41, change "to be place" to "to be placed".
Column 2, line 46, change "be place" to "be placed".

Column 5, line 32, change "with" to "width".
Column 5, line 33, change "to be place" to "to be placed".
Column 5, line 34, change "rest" to "rests".
Column 5, line 46, change "closets" to "closest".
Column 6, line 4, change "to be place" to "to be placed".
Column 6, line 25, change "slap" to "lap".
Column 6, line 28, change "slap" to "lap".
Column 6, line 39, change "slap" to "lap".
Column 6, line 42, change "slap" to "lap".
Column 6, line 51, change "be place" to "be placed".

Signed and Sealed this

Twenty-sixth Day of July, 1994

Attest:

BRUCE LEHMAN

Attesting Officer         Commissioner of Patents and Trademarks